United States Patent
Ritter et al.

(10) Patent No.: US 8,651,953 B2
(45) Date of Patent: Feb. 18, 2014

(54) ELECTRONIC GAME DEVICE AND METHOD OF USING THE SAME

(75) Inventors: Janice E. Ritter, Redondo Beach, CA (US); Brian M. Yu, Los Angeles, CA (US); Tadd L. Callies, Pasadena, CA (US); E. Ernst Ginkel, La Verne, CA (US); Darin Marshal Barri, Los Angeles, CA (US); Robert John Grzesek, Redondo Beach, CA (US); Jorge Castro Sanchez, Downey, CA (US)

(73) Assignee: Mattel, Inc., El Segundo, CA (US)

( * ) Notice: Subject to any disclaimer, the term of this patent is extended or adjusted under 35 U.S.C. 154(b) by 854 days.

(21) Appl. No.: 12/858,834

(22) Filed: Aug. 18, 2010

(65) Prior Publication Data
US 2010/0311485 A1 Dec. 9, 2010

Related U.S. Application Data

(63) Continuation of application No. 11/670,334, filed on Feb. 1, 2007, now abandoned.

(51) Int. Cl.
A63F 9/24 (2006.01)
A63F 13/00 (2006.01)

(52) U.S. Cl.
USPC ......... 463/36; 463/9; 463/30; 463/31; 463/37

(58) Field of Classification Search
USPC ...................... 463/36–37, 9, 30–31
See application file for complete search history.

(56) References Cited

U.S. PATENT DOCUMENTS

| | | | |
|---|---|---|---|
| 3,043,947 A | 7/1962 | Albinger, Jr. | |
| 3,241,256 A | 3/1966 | Viret et al. | |
| 3,752,974 A | 8/1973 | Baker et al. | |
| 4,043,559 A | 8/1977 | Eigen et al. | |
| 4,373,282 A | 2/1983 | Wragg | |
| 4,714,983 A | 12/1987 | Lang | |
| 4,809,979 A * | 3/1989 | Skowronski et al. | 463/9 |
| 4,811,507 A | 3/1989 | Blanchet | |
| 4,937,709 A | 6/1990 | Yanagi et al. | |
| 4,957,291 A | 9/1990 | Miffitt et al. | |
| 5,005,108 A | 4/1991 | Pristash et al. | |
| 5,036,435 A | 7/1991 | Tokuda et al. | |
| 5,088,928 A | 2/1992 | Chan | |
| 5,128,842 A | 7/1992 | Kenmochi | |
| 5,130,898 A | 7/1992 | Akahane | |
| 5,134,549 A | 7/1992 | Yokoyama | |
| 5,363,294 A | 11/1994 | Yamamoto et al. | |
| 5,386,347 A | 1/1995 | Matsumoto | |

(Continued)

FOREIGN PATENT DOCUMENTS

EP 1659757 A2 5/2006
GB 2155796 A 10/1985

(Continued)

*Primary Examiner* — Werner Garner
(74) *Attorney, Agent, or Firm* — Edell, Shapiro & Finnan LLC

(57) ABSTRACT

An electronic question and answer game device in accordance with the present invention comprises a housing that has several side walls or surfaces. A display screen is disposed on one of the sides. The display screen is configured to present a question to the user of the electronic device. The electronic game device includes several mechanisms that vary the methods in which a user can play the game.

20 Claims, 13 Drawing Sheets

(56) References Cited

U.S. PATENT DOCUMENTS

| | | |
|---|---|---|
| 5,394,308 A | 2/1995 | Watanabe et al. |
| 5,440,326 A | 8/1995 | Quinn |
| 5,521,797 A | 5/1996 | Kashima et al. |
| 5,528,709 A | 6/1996 | Koike et al. |
| 5,542,672 A | 8/1996 | Meredith |
| 5,550,676 A | 8/1996 | Ohe et al. |
| 5,613,751 A | 3/1997 | Parker et al. |
| 5,613,909 A | 3/1997 | Stelovsky |
| 5,618,096 A | 4/1997 | Parker et al. |
| 5,619,351 A | 4/1997 | Funamoto et al. |
| 5,703,623 A | 12/1997 | Hall et al. |
| 5,730,655 A | 3/1998 | Meredith |
| 5,796,354 A | 8/1998 | Cartabiano et al. |
| 5,853,327 A | 12/1998 | Gilboa |
| 5,876,107 A | 3/1999 | Parker et al. |
| 5,898,421 A | 4/1999 | Quinn |
| 5,921,651 A | 7/1999 | Ishikawa |
| 5,921,652 A | 7/1999 | Parker et al. |
| 5,971,855 A | 10/1999 | Ng |
| 5,992,849 A | 11/1999 | Olti et al. |
| 6,036,327 A | 3/2000 | Blonder et al. |
| 6,065,845 A | 5/2000 | Miyazaki |
| 6,079,838 A | 6/2000 | Parker et al. |
| 6,086,478 A | 7/2000 | Klitsner et al. |
| 6,102,397 A | 8/2000 | Lee et al. |
| 6,117,011 A | 9/2000 | Lvov |
| 6,126,546 A | 10/2000 | Reed et al. |
| 6,139,163 A | 10/2000 | Satoh et al. |
| 6,160,540 A | 12/2000 | Fishkin et al. |
| 6,162,123 A | 12/2000 | Woolston |
| 6,165,873 A | 12/2000 | Hamada |
| 6,210,278 B1 | 4/2001 | Klitsner |
| 6,273,819 B1 | 8/2001 | Strauss et al. |
| 6,312,335 B1 | 11/2001 | Tosaki et al. |
| 6,312,336 B1 | 11/2001 | Handelman et al. |
| 6,315,668 B1 | 11/2001 | Metke et al. |
| 6,368,218 B2 | 4/2002 | Angell, Jr. |
| 6,375,572 B1 | 4/2002 | Masuyama et al. |
| 6,377,187 B1 | 4/2002 | Fong |
| 6,437,703 B1 | 8/2002 | Fong |
| 6,439,996 B2 | 8/2002 | LeMay et al. |
| 6,454,452 B1 | 9/2002 | Sasagawa et al. |
| 6,460,851 B1 | 10/2002 | Lee et al. |
| 6,517,438 B2 | 2/2003 | Tosaki et al. |
| 6,544,126 B2 | 4/2003 | Sawano et al. |
| 6,582,095 B1 | 6/2003 | Toyoda |
| 6,595,651 B2 | 7/2003 | Jeong et al. |
| 6,609,809 B2 | 8/2003 | Ohkawa |
| 6,641,482 B2 | 11/2003 | Masuyama et al. |
| 6,669,350 B2 | 12/2003 | Yamashita et al. |
| 6,669,563 B1 | 12/2003 | Kitami et al. |
| 6,671,013 B1 | 12/2003 | Ohkawa |
| 6,676,268 B2 | 1/2004 | Ohkawa |
| 6,712,481 B2 | 3/2004 | Parker et al. |
| 6,725,505 B2 | 4/2004 | Willat |
| 6,731,355 B2 | 5/2004 | Miyashita |
| 6,749,312 B2 | 6/2004 | Parker et al. |
| 6,752,505 B2 | 6/2004 | Parker et al. |
| 6,755,547 B2 | 6/2004 | Parker |
| 6,761,461 B2 | 7/2004 | Mizutani et al. |
| 6,761,636 B2 | 7/2004 | Chung et al. |
| 6,761,637 B2 | 7/2004 | Weston et al. |
| 6,800,031 B2 | 10/2004 | Di Cesare |
| 6,814,457 B2 | 11/2004 | Chang et al. |
| 6,827,456 B2 | 12/2004 | Parker et al. |
| 6,884,171 B2 | 4/2005 | Eck et al. |
| 6,902,482 B1 | 6/2005 | Woolston |
| 6,909,374 B2 | 6/2005 | Fong |
| 6,910,783 B2 | 6/2005 | Mezei et al. |
| 6,929,543 B1 | 8/2005 | Ueshima et al. |
| 6,967,566 B2 | 11/2005 | Weston et al. |
| 6,971,758 B2 | 12/2005 | Inui et al. |
| 6,975,370 B2 | 12/2005 | Yu et al. |
| 6,979,112 B2 | 12/2005 | Yu et al. |
| 6,986,712 B1 | 1/2006 | Ogawa |
| 7,004,611 B2 | 2/2006 | Parker et al. |
| 7,008,288 B2 | 3/2006 | Covannon et al. |
| 7,014,351 B2 | 3/2006 | Leu et al. |
| 7,044,628 B2 | 5/2006 | Choi et al. |
| 7,077,544 B2 | 7/2006 | Parker |
| 7,090,389 B2 | 8/2006 | Parker et al. |
| 7,094,154 B2 | 8/2006 | Kellerman et al. |
| 7,108,414 B2 | 9/2006 | McCollum et al. |
| 7,139,048 B2 | 11/2006 | Han et al. |
| 7,145,551 B1 | 12/2006 | Bathiche et al. |
| 7,160,015 B2 | 1/2007 | Parker |
| 7,165,873 B2 | 1/2007 | Parker |
| 7,171,105 B2 | 1/2007 | Winkler |
| 7,178,965 B2 | 2/2007 | Parker |
| 7,192,176 B2 | 3/2007 | Lo et al. |
| 7,195,389 B2 | 3/2007 | Parker et al. |
| 7,226,196 B2 | 6/2007 | Parker et al. |
| 7,230,605 B2 | 6/2007 | Rekimoto et al. |
| 7,351,152 B2 | 4/2008 | Abe et al. |
| 2001/0009866 A1 | 7/2001 | Klitsner et al. |
| 2001/0024973 A1 | 9/2001 | Meredith |
| 2002/0028709 A1 | 3/2002 | Finer et al. |
| 2002/0045484 A1 | 4/2002 | Eck et al. |
| 2002/0068630 A1 | 6/2002 | Dunlap |
| 2002/0068632 A1 | 6/2002 | Dunlap |
| 2002/0086730 A1 | 7/2002 | Nakai |
| 2003/0022716 A1 | 1/2003 | Park et al. |
| 2003/0027636 A1 | 2/2003 | Covannon et al. |
| 2003/0036428 A1 | 2/2003 | Aasland |
| 2003/0045356 A1 | 3/2003 | Thomas |
| 2003/0045358 A1 | 3/2003 | Leen et al. |
| 2003/0062675 A1 | 4/2003 | Noro et al. |
| 2003/0064812 A1 | 4/2003 | Rappaport et al. |
| 2003/0083118 A1 | 5/2003 | Nelson et al. |
| 2003/0095401 A1 | 5/2003 | Hanson et al. |
| 2003/0123246 A1 | 7/2003 | Parker |
| 2003/0162594 A1 | 8/2003 | Rowe |
| 2003/0211888 A1 | 11/2003 | Wolinsky |
| 2004/0008505 A1 | 1/2004 | Chiang |
| 2004/0012945 A1 | 1/2004 | Yamashita et al. |
| 2004/0018878 A1 | 1/2004 | Silverman |
| 2004/0072617 A1 | 4/2004 | Takahashi et al. |
| 2004/0087373 A1 | 5/2004 | Choi |
| 2004/0096810 A1 | 5/2004 | Wells et al. |
| 2004/0097288 A1 | 5/2004 | Sloate et al. |
| 2004/0106091 A1* | 6/2004 | Weiner et al. .................. 434/236 |
| 2004/0165371 A1 | 8/2004 | Kitamura et al. |
| 2004/0166937 A1 | 8/2004 | Rothschild et al. |
| 2004/0176170 A1 | 9/2004 | Eck et al. |
| 2004/0204240 A1 | 10/2004 | Barney |
| 2004/0224775 A1 | 11/2004 | Wood et al. |
| 2004/0242325 A1 | 12/2004 | Levitan et al. |
| 2004/0252482 A1 | 12/2004 | Tsai |
| 2004/0259633 A1 | 12/2004 | Gentles et al. |
| 2005/0013127 A1 | 1/2005 | Tsai |
| 2005/0022182 A1 | 1/2005 | Mittal |
| 2005/0024849 A1 | 2/2005 | Parker et al. |
| 2005/0032582 A1 | 2/2005 | Mahajan et al. |
| 2005/0056997 A1 | 3/2005 | Wakitani et al. |
| 2005/0059489 A1 | 3/2005 | Kim |
| 2005/0068293 A1 | 3/2005 | Satoh et al. |
| 2005/0085297 A1 | 4/2005 | Onoda et al. |
| 2005/0101364 A1 | 5/2005 | Onoda et al. |
| 2005/0107165 A1 | 5/2005 | Mendelson et al. |
| 2005/0113172 A1 | 5/2005 | Gong |
| 2005/0119036 A1 | 6/2005 | Albanna et al. |
| 2005/0122591 A1 | 6/2005 | Parker et al. |
| 2005/0128375 A1 | 6/2005 | Hsu |
| 2005/0130739 A1 | 6/2005 | Argentar |
| 2005/0143173 A1 | 6/2005 | Barney et al. |
| 2005/0187020 A1 | 8/2005 | Amaitis et al. |
| 2005/0207154 A1 | 9/2005 | Parker |
| 2005/0219860 A1 | 10/2005 | Schexnaider |
| 2005/0221898 A1 | 10/2005 | Gatto et al. |
| 2005/0227751 A1 | 10/2005 | Zanelli et al. |
| 2005/0227775 A1 | 10/2005 | Cassady et al. |
| 2005/0239550 A1 | 10/2005 | Hardisty et al. |
| 2005/0245312 A1 | 11/2005 | Peng et al. |
| 2005/0245315 A1 | 11/2005 | Shimizu et al. |

(56) References Cited

U.S. PATENT DOCUMENTS

| | | |
|---|---|---|
| 2005/0250580 A1 | 11/2005 | Bird |
| 2005/0266906 A1 | 12/2005 | Stevens |
| 2005/0282635 A1 | 12/2005 | Aoki |
| 2005/0288099 A1 | 12/2005 | Shimizu et al. |
| 2006/0025229 A1 | 2/2006 | Mahajan et al. |
| 2006/0028843 A1 | 2/2006 | Parker |
| 2006/0028844 A1 | 2/2006 | Parker |
| 2006/0030385 A1 | 2/2006 | Barney et al. |
| 2006/0030408 A1 | 2/2006 | Kiiskinen |
| 2006/0035707 A1 | 2/2006 | Nguyen et al. |
| 2006/0035713 A1 | 2/2006 | Cockerille et al. |
| 2006/0046810 A1 | 3/2006 | Tabata |
| 2006/0050532 A1 | 3/2006 | Stadtwald-Klenke |
| 2006/0068915 A1 | 3/2006 | Okada |
| 2006/0068916 A1 | 3/2006 | Hiranoya et al. |
| 2006/0068917 A1 | 3/2006 | Snoddy et al. |
| 2006/0072339 A1 | 4/2006 | Li et al. |
| 2006/0103630 A1 | 5/2006 | Mashima et al. |
| 2006/0139953 A1 | 6/2006 | Chou et al. |
| 2006/0148568 A1 | 7/2006 | Schultz et al. |
| 2006/0154726 A1 | 7/2006 | Weston et al. |
| 2006/0154730 A1 | 7/2006 | Okuniewicz |
| 2006/0154733 A1 | 7/2006 | Wu |
| 2006/0158901 A1 | 7/2006 | Wang |
| 2006/0160594 A1 | 7/2006 | Brase |
| 2006/0164863 A1 | 7/2006 | Chang et al. |
| 2006/0166737 A1 | 7/2006 | Bentley |
| 2006/0175753 A1 | 8/2006 | MacIver et al. |
| 2006/0176712 A1 | 8/2006 | Takada |
| 2006/0178212 A1 | 8/2006 | Penzias |
| 2006/0202427 A1 | 9/2006 | McDougal |
| 2006/0211464 A1 | 9/2006 | Malobabic |
| 2006/0223599 A1 | 10/2006 | Alfaro et al. |
| 2006/0223635 A1 | 10/2006 | Rosenberg |
| 2006/0230428 A1 | 10/2006 | Craig et al. |
| 2006/0245211 A1 | 11/2006 | Takada |
| 2006/0252532 A1 | 11/2006 | Stovall |
| 2006/0256577 A1 | 11/2006 | Parker et al. |
| 2006/0262567 A1 | 11/2006 | Parker |
| 2006/0264258 A1 | 11/2006 | Zalewski et al. |
| 2006/0282873 A1 | 12/2006 | Zalewski et al. |
| 2007/0008739 A1 | 1/2007 | Kim et al. |
| 2007/0021210 A1 | 1/2007 | Tachibana |
| 2007/0049374 A1 | 3/2007 | Ikeda et al. |
| 2007/0052177 A1 | 3/2007 | Ikeda et al. |
| 2007/0060228 A1 | 3/2007 | Akasaka et al. |
| 2007/0060384 A1 | 3/2007 | Dohta |
| 2007/0060385 A1 | 3/2007 | Dohta |
| 2007/0060391 A1 | 3/2007 | Ikeda et al. |
| 2007/0066394 A1 | 3/2007 | Ikeda et al. |
| 2007/0072674 A1 | 3/2007 | Ohta et al. |
| 2007/0072680 A1 | 3/2007 | Ikeda |
| 2007/0080940 A1 | 4/2007 | Aoki et al. |
| 2007/0093291 A1 | 4/2007 | Hulvey |
| 2007/0093295 A1 | 4/2007 | Liou |
| 2007/0103933 A1 | 5/2007 | Parker |
| 2007/0130582 A1 | 6/2007 | Chang et al. |

FOREIGN PATENT DOCUMENTS

| | | |
|---|---|---|
| GB | 2237514 A | 5/1991 |
| JP | 2000308756 | 7/2000 |
| JP | 2003053264 A | 2/2003 |
| WO | 9603188 A1 | 2/1996 |
| WO | 0230534 A1 | 4/2002 |
| WO | 03053531 A1 | 7/2003 |
| WO | 2006039735 A1 | 4/2006 |

* cited by examiner

ELECTRONIC GAME DEVICE AND METHOD OF USING THE SAME

CROSS-REFERENCE TO RELATED APPLICATION

This application is a continuation of U.S. patent application Ser. No. 11/670,334, entitled "Electronic Game Device and Method of Using the Same," filed Feb. 1, 2007, the disclosure of which is incorporated by reference herein in its entirety.

BACKGROUND OF THE INVENTION

This invention relates generally to an electronic game device, and in particular, to an electronic game device with a variety of game playing features.

There are many types of electronic game devices. Typically, these electronic game devices have one or more buttons that a user can press to provide input to an activity on the electronic device. The repeated pressing of the same button or buttons to play a game may render an electronic device unappealing and boring. Such electronic devices lack the ability to provide creative, dynamic and enjoyable game play for a user.

Thus, a need exists for an electronic game device that includes creative ways for a user to select answers and to play a game. Further, there is a need for an interactive electronic game device that continuously changes the play pattern or use of the game device.

SUMMARY OF THE INVENTION

An electronic game device in accordance with the present invention comprises a housing that has several side walls or surfaces. A display screen is disposed on one of the sides. The display screen is configured to present a question to the user of the electronic device. The electronic game device includes several mechanisms that vary the methods in which a user can play the game.

DETAILED DESCRIPTION

The phrase "question and answer" as used herein is intended to include, but not be limited to any type of problem, question, query, inquiry, answer, fact, clue, topic, or statement.

Figure 1:
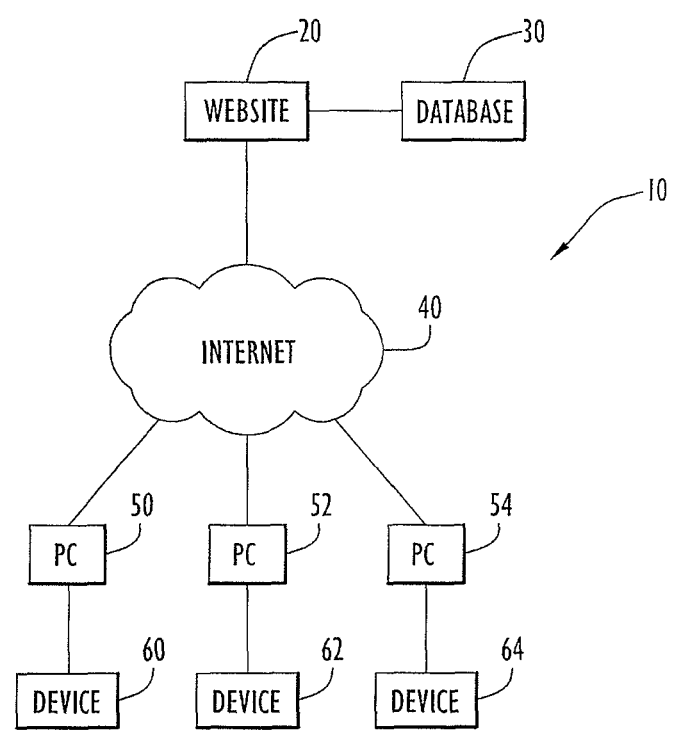
FIG. 1 is a block diagram of an embodiment of a game system according to the invention.

A block diagram of a system according to an embodiment of the present invention is illustrated in FIG. 1. The system 10 includes a website 20 that includes information relating to one or more games. In one embodiment, the information may include game content, such as different games or questions, and other user activities. The website 20 includes a game database 30 in which information relating to the games can be retained. For example, information relating to the scores and results of players from playing the games can be stored and maintained in the database 30. The website 20 is accessible via a network such as the Internet 40 in any conventional manner. It is to be understood that the website 20 forms a part of the Internet 40, but is illustrated as a separate item for purposes of discussion herein.

The website 20 and database 30 can be located on a game server (not shown) that is associated with the game. Periodic updates of game content, including questions, challenges and players' scores can be made to the game database 30. The database 30 can have multiple levels of information and accessibility, all of which can be governed based upon the identification of a user. In other words, a user's name and password can provide the user with access to different levels of information.

As illustrated in FIG. 1, one or more players can connect to the website 20 and download particular game content and upload game statistics. In one embodiment, each player can access the website 20 by using his or her electronic device and a personal computer. As shown, there are electronic devices 60, 62, and 64 that are connected to computers 50, 52, and 54 respectively, via conventional communication links. Similarly, the computers 50, 52, and 54 are connected to the Internet 40 via conventional communication links.

In other embodiments, a user may connect an electronic game device to the website 20 via a wireless connection and without the use of a computer. In that embodiment, the electronic device has the wireless communication functionality that would enable such communications.

Access to the website 20 will enable users to receive upgrades to the game on the electronic device, have their scores posted, have the computer unlock hidden features in the database 30 associated with the website 20.

Figure 2:
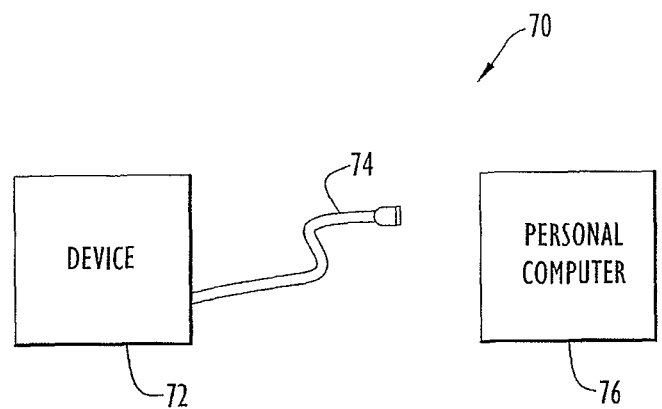
FIG. 2 is a block diagram of an embodiment of an individual user's game device according to the invention.

A block diagram of an embodiment of a user system is illustrated in FIG. 2. In this embodiment, the user system 70 includes an electronic device 72 and a personal computer 76. The electronic device 72 can be operated by itself in stand-alone mode. However, the electronic device 72 can also be connected to the computer 76 to facilitate the downloading of information from the website 20 to the electronic device 72 and the uploading of information from the electronic device 72 to the website 20. The downloaded information may include a new lights and sounds sequence each time a new game is downloaded.

The electronic game device 72 of the present invention can have multiple modes of operation. One exemplary mode is an ambient mode and the other mode is a game play mode. In the game play mode, game challenges will be a part of each download to include audio and visual enhancement of the play of the device. The ambient mode is a lights and/or sounds mode that has dedicated programming that generates outputs. In the ambient mode, various combinations of lights and/or sounds, or other visual and audible outputs, are generated by the electronic game device as entertainment. The ambient mode can occur either if the electronic game device is not being used or is in the hands of a user being mindlessly manipulated, such as being rotated or shaken. In other words, the ambient mode can occur whenever a game is not being played. The lights and/or sounds sequences that accompany the download of a new game may used in the ambient mode of operation. The continually changing of lights and/or sounds sequences increases the variety and unpredictable outputs generated by the electronic game device 72.

The electronic device 72 can be connected to the computer 76 via a cable 74. In one implementation, the cable 74 is fixedly coupled or tethered at one end to the device 72 and removably coupleable to the computer 76 at its other end. In another implementation, each end of the cable 74 can be removably coupleable to either the electronic device 72 or the computer 76. The cable 74 may be, for example, a USB cable. The electronic device 72 can include preloaded game software, such as a sample game, for the user to play prior to connecting the electronic device 72 to the computer 76.

Figure 3:
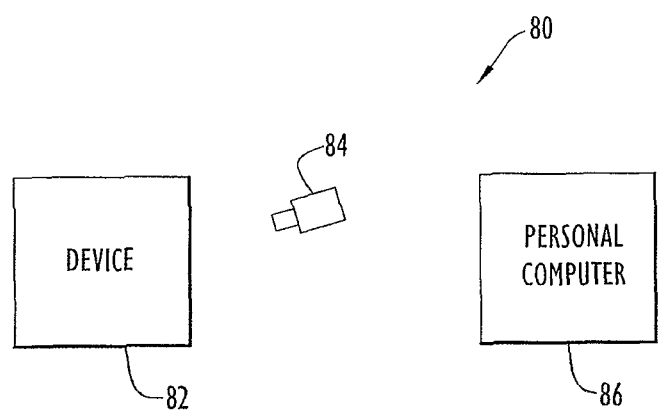
FIG. 3 is a block diagram of an alternative embodiment of an individual user's game device according to the invention.

A block diagram of an alternative embodiment of a user system is illustrated in FIG. 3. In this embodiment, the user system 80 includes an electronic device 82 and a personal computer 86. Similar to electronic device 72, the electronic device 82 can be operated by itself in stand-alone mode. In this implementation, information from the website 20 can be downloaded to the computer 86 and transferred to the electronic device 82 via a flash disk or drive 84.

In the various embodiments of the invention, the game software and any applications related to the electronic game are compatible with any type of computer system and any type of operating system. For example, the software, applications, and electronic game device can be compatible with an APPLE MACINTOSH computer system. Alternatively, the software, applications, and electronic game device can be compatible with any type of MICROSOFT WINDOWS operating system or platform.

Figure 4:
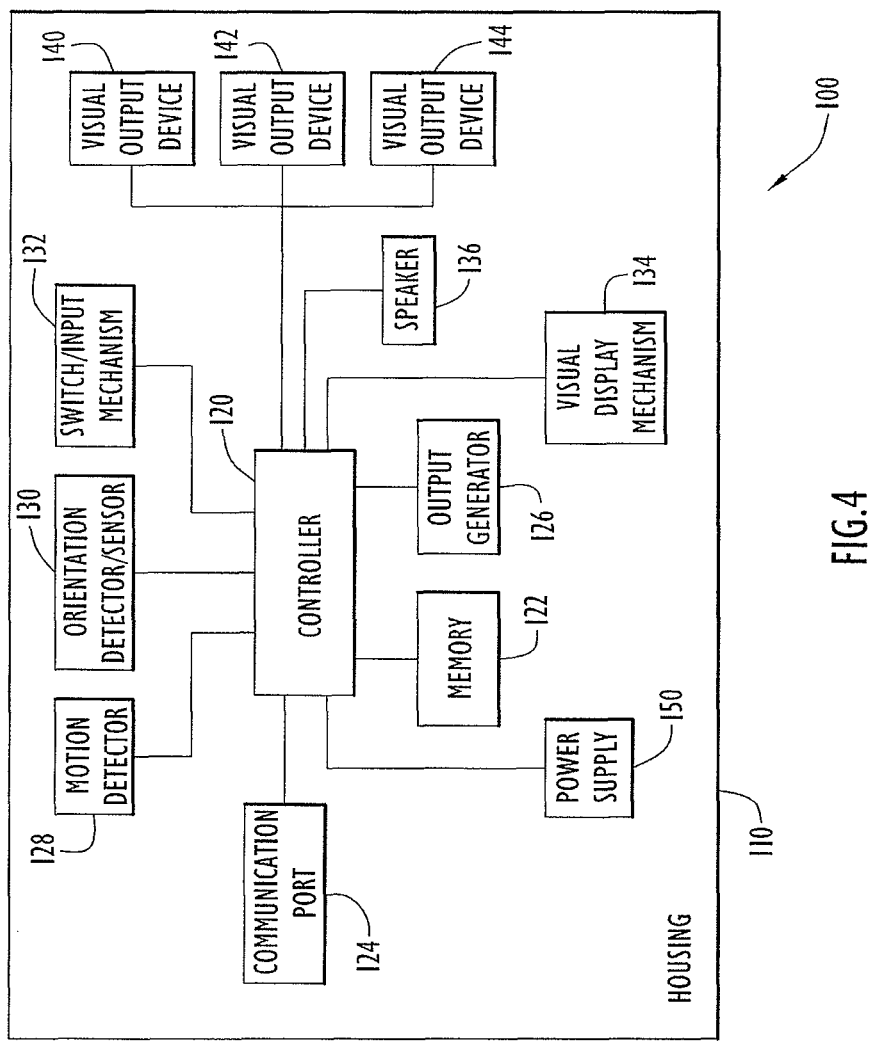
FIG. 4 is a block diagram of an embodiment of the components of the electronic device according to the invention.

A block diagram of an embodiment of an electronic game device is illustrated in FIG. 4. In this embodiment, the electronic game device 100 includes a housing 110 and several components that facilitate the playing of a game on the electronic game device 100. In this embodiment, the electronic game device 100 includes a controller 120 that controls the operation of the electronic device 100. The device 100 includes a memory 122 in which preprogrammed game content as well as game content and information subsequently downloaded from website 20 may be stored. The memory 122 can include any conventional memory device.

In one embodiment, the device 100 includes a communication port 124 to which a connector may be coupled to connect the device 100 to a computer. A power supply 150, such as conventional batteries, is provided to allow the device 100 to operate in a stand-alone manner. In another embodiment, the power supply 150 may include rechargeable batteries.

The electronic game device 100 can generate audio and/or visual outputs. The outputs may be part of a game, such as the presentation of a question or statement to a user, or an indication of whether an answer inputted by the user is accurate. Each of these types of outputs may include audible and/or visual components. The electronic game device 100 includes an output generator 126 that functions to generate the appropriate audible or visual outputs.

In one embodiment, the electronic device 100 includes a visual display mechanism 134 on which a visual output may be presented. The visual display mechanism 134 can be an LCD screen or other similar type of screen. During the operation of the electronic device 100, the visual output such as a question or statement can be displayed on the screen 134 and the user can read the output. The electronic device 100 also includes a speaker 136 that generates the audible outputs. The audible outputs can include sound effects, speech, music or other audible sounds. The audible outputs can be generated in response to particular inputs by a player, in response to movement of the housing 110, or continuously or intermittently in an "ambient" mode of operation.

The electronic game device 100 includes several mechanisms that are used to obtain user input during the operation of a game. In the embodiment illustrated in FIG. 4, the electronic game device 100 includes a motion detector 128, an orientation detector 130 and a switch or input mechanism 132. The function of each of these will be described in detail below. The electronic game device 100 is configured so that a user physically interacts with the electronic game device 100.

In alternative embodiments, the electronic game device may not include each of these items. For example, the functions of detecting motion and detecting orientation may be performed by a single component, such as an accelerometer. Alternatively, the electronic game device may not include both of those functions. The accelerometer can be used to find the angle at which the housing is tilted with respect to the ground and/or to find the direction in which or the speed at which the housing is moving.

The motion detector 128 is used to determine movement of the housing 110 in a particular direction or directions. In one embodiment, the electronic game device 100 can be used to play a game in which the user must move the housing 110 in a particular direction or directions to input an answer to the game. The motion detector 128 can determine whether the user is moving the housing 110 in the appropriate manner. An exemplary motion detector 128 is a piezoelectric switch or accelerometer which is connected to the controller.

In this embodiment, the orientation detector 130 is used to determine the orientation of the housing 110. The housing 110 may include multiple sides or surfaces and the orientation detector 130 can determine the orientation of the sides or surfaces with respect to a particular configuration. For example, the electronic game device 100 can be used to play a game in which the user must place the housing 110 in a particular configuration or orientation to input a response or answer. When the user selects or registers an answer, the orientation detector 130 determines the orientation of the housing 110 and compares the orientation to the stored, correct answer.

The switch or input mechanism 132 can be actuated by a user to input or register an answer. In one embodiment, the switch 132 is an internal switch that is closed when the user taps or contacts the housing 110. In another embodiment, the switch 132 is an external switch that is contacted by the user to register an answer. In another embodiment, the electronic game device includes multiple switches at different locations on the housing, each of which can be selected by a user to input a particular answer.

When the switch or input mechanism 132 is actuated, the controller, through the components previously described, obtains the other input or inputs that the user has performed, such as the movement of the housing 110 or the re-orientation of the housing 110. This analysis is used to determine whether the appropriate response or answer has been inputted by the user.

In one embodiment, an inductive switch may be used. A hot spot or a touch pad may be provided on one or more of the sides or surfaces of the housing. The inductive switch can provide an interactive option in place of or in addition to tapping the housing 110. In another embodiment, the electronic game device can include a capacitive sensing chip that functions by sensing a change in a small field or area around a touch pad on the housing 110. The housing 110 of the electronic game device 100 can include several designated touch pads, each of which has a capacitive sensing chip located nearby.

Alternatively, a ball motion switch can be used to determine motion and/or orientation of the housing. In another embodiment, one or more directional pads can be provided at locations on the housing. Each of these items can be actuated by the user to register an answer or make a selection.

As illustrated in FIG. 4, this embodiment of the housing 110 includes several visual output devices. While three visual output devices 140, 142, and 144 are illustrated, any number of such devices can be included with the housing.

Visual output devices 140, 142, and 144 are used to generate a visual output that can be seen by the user. An exemplary visual output device is a light emitting device, such as an LED. The visual output devices can be activated as part of a game or alternatively, in response to the determination of whether an answer was correct.

The visual output devices 140, 142, and 144 and the speaker 136 can be activated to provide visual and/or audible output in an ambient mode of operation of the device.

Figure 5:
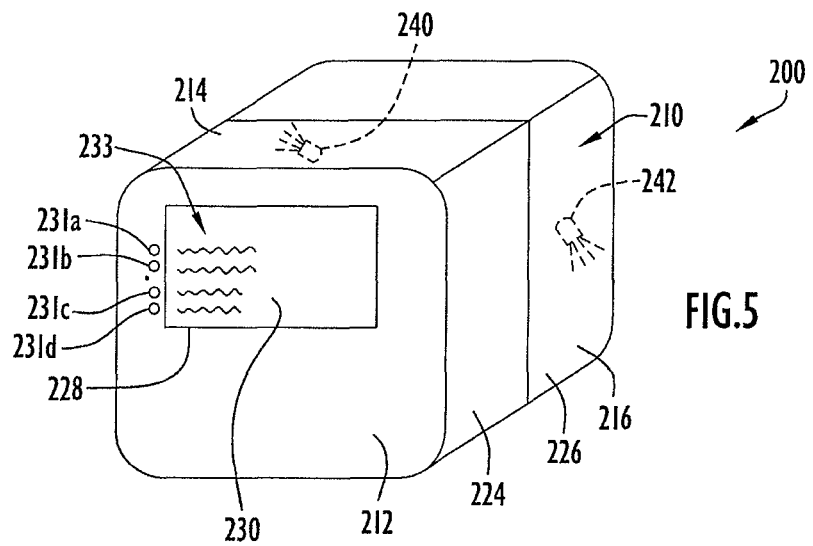
FIG. 5 is a front perspective view of an embodiment of an electronic device according to the invention.
Figures 6, 7:
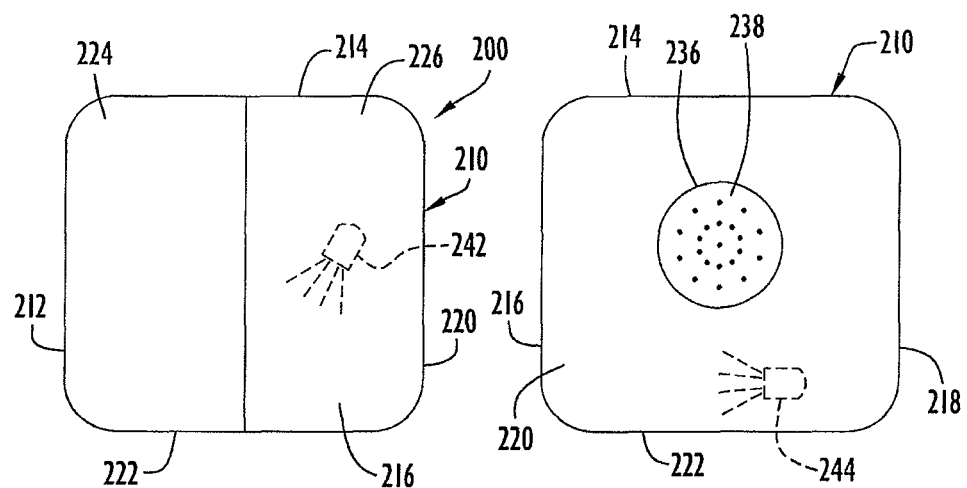
FIG. 6 is a side view of the electronic device illustrated in FIG. 5.
FIG. 7 is a rear view of the electronic device illustrated in FIG. 5.

An embodiment of an electronic game device is illustrated in FIGS. 5-7. In this embodiment, the electronic game device 200 includes a housing 210. The housing 210 can be formed of two portions 224, 226 that are coupled together via conventional means, such as fasteners. The housing 210 is formed of a translucent material, such as plastic, which permits light to pass through a side of the housing 210. In alternative embodiments, the housing can be made of semi-translucent, semi-transparent, or transparent material.

The housing 210 includes several side walls or surfaces 212, 214, 216, 218, 220, and 222. In this implementation, the housing 210 is in the shape of a cube. In other implementations, the housing 210 may have any number of sides or surfaces.

As illustrated, side 212 includes an opening 228 formed therein. A visual display mechanism or display screen 230 is disposed proximate to the opening 228. A user can view a statement or question displayed on the screen 230 during operation of the device 200. Referring to FIG. 7, side 220 includes an opening 236 formed therein. A speaker 238 is disposed in the opening 236 and can generate audible outputs. In different embodiments, the locations of the screen 230 and the speaker 238 on the housing 210 can vary.

In one embodiment, the screen 230 is a black and white LCD with several multicolor LEDs mounted along one side of the LCD. The LEDs are aligned with a different line of text that appears on the screen 230. Referring to FIG. 5, several LEDs 231a, 231b, 231c, and 231d are illustrated as being aligned with different lines 233 of text on the screen 230. As discussed in greater detail below, in some games, the players select a particular answer based on a color associated with that answer. The LEDs 231a, 231b, 231c, and 231d can be illuminated in different colors so that a player can select one of the colors based on the desired answer to a question. In another embodiment, the screen 230 provides color output and different lines of text are associated with a color on the screen.

As illustrated in FIGS. 5-8, the electronic game device 200 includes several visual output devices 240, 242, and 244, which are illustrated in phantom. The visual output devices 240, 242, and 244 are disposed at different locations around the housing 210. In particular, the visual output devices 240, 242, and 244 are disposed proximate to sides 214, 216, and 220, respectively. As the material of the housing 210 is translucent, the output, such as light, from each of the devices 240, 242, and 244 is visible through the side wall adjacent to the particular device.

In one embodiment, the visual output devices are light emitting devices, such as LEDs, and each of the light emitting devices generates a different color light. The visual output devices or LEDs are spaced apart around the housing 210. In this embodiment, there is an LED that corresponds to each of the sides of housing 210.

In one embodiment, visual output device 240 generates red light, visual output device 242 generates green light and visual output device 244 generates blue light. Accordingly, the red light illuminates side wall 214 so that it appears red, the green light illuminates side wall 216 so that it appears green, and the blue light illuminates side 220 so that it appears blue. In other embodiments, the quantity of visual output devices and the colors of the light emitted from the various output devices can vary. In another embodiment, each of the visual output devices is a multi-colored LED. In another embodiment, pulse width modulation can be used to control colors and output of the LEDs.

Figure 8:
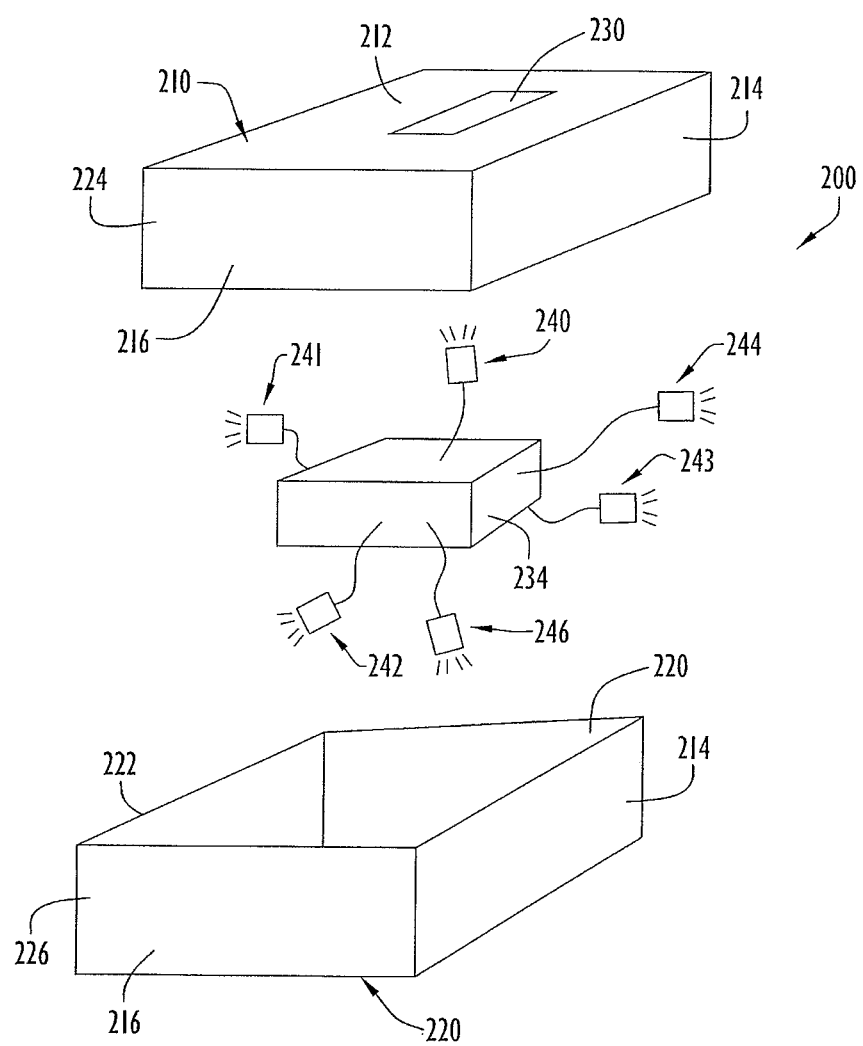
FIG. 8 is an exploded perspective view of some components of the electronic device illustrated in FIG. 5.

Referring to FIG. 8, an exploded perspective view of the electronic game device 200 is illustrated. As shown, the portions 224 and 226 of the housing 210 are separate apart allowing the illustration of some of the internal components. The block 234 is a generic representation of the electronic components of the electronic game device 200. Several visual output devices 240, 241, 242, 243, 244, and 246 are illustrated. The relative positioning of the devices 240, 241, 242, 243, 244, and 246 around the housing 210 is shown.

In one embodiment, the entire housing 210 of the electronic game device 200 is illuminated a particular color at one time. In this embodiment, the visual output devices of the electronic game device 200 are illuminated at the same time to output the same color. The electronic game device 200 includes a position or orientation sensor, such as an accelerometer, that determines which side of the housing 210 is oriented in a particular direction. For example, the sensor can determine which side of the housing 210 is oriented in an upward direction. Depending on the particular orientation of the housing 210, the visual output devices of the electronic game device 200 can generate different outputs, such as colors. In other words, each of the sides of the housing 210 is associated with a particular output, such as a color. Therefore, when a side of the housing 210 is oriented upwardly, a color output is generated by the visual output devices and the entire housing 210 is illuminated in that particular color. In this implementation, the entire housing and not a particular side of the housing 210 lights up a particular color.

In this embodiment, when side 214 is oriented to face upwardly, all of the visual output devices generate light of a first color. When the housing 210 is manipulated so that side 216 is oriented to face upwardly, all of the visual output devices generate light of a second color, which is different than the first color. When the housing 210 is subsequently manipulated so that sides 218, 220, 222, and 224 are oriented to face upwardly, the visual output devices generate light of colors different than the first color and the second color, depending on the particular side that is oriented upwardly. In this implementation, the housing 210 has six sides and the visual output devices can generate six different colors. The six different colors may be red, green, purple, dark blue, light blue, yellow. The palette of colors for the LEDs that can be used may include: red, green, blue, red/green, red/blue, and blue/green. This arrangement of LED colors allows the individual LEDs to be all illuminated at the same time or all not illuminated. In other embodiments, colors other than those colors or in addition to some of those colors can be used.

In an alternative embodiment, the electronic game device can have fewer visual output devices than the number of sides of the housing. For example, the housing may include six sides and five or fewer visual output devices or LEDs.

The electronic game device may include buttons on the housing that are associated with different functions or operations. One button may be pressed or actuated to pull up a menu. Another button may be actuated to scroll upward and advance to a next item. Another button may be actuated to scroll downward and return to a previous item.

In another embodiment, the electronic game device can generate different audible outputs, such as words or sounds, depending on the orientation of the housing. In this embodiment, when side 214 is oriented to face upwardly, the housing generates an audible output associated with a letter, sound or one or more words. For example, the housing can generate the letter "a." When the housing 210 is manipulated so that side 216 is oriented to face upwardly, the housing generates a different audible output, such as the letter "b." In a similar manner, the outputs generated can vary depending on the side that is oriented upwardly.

Figure 9:
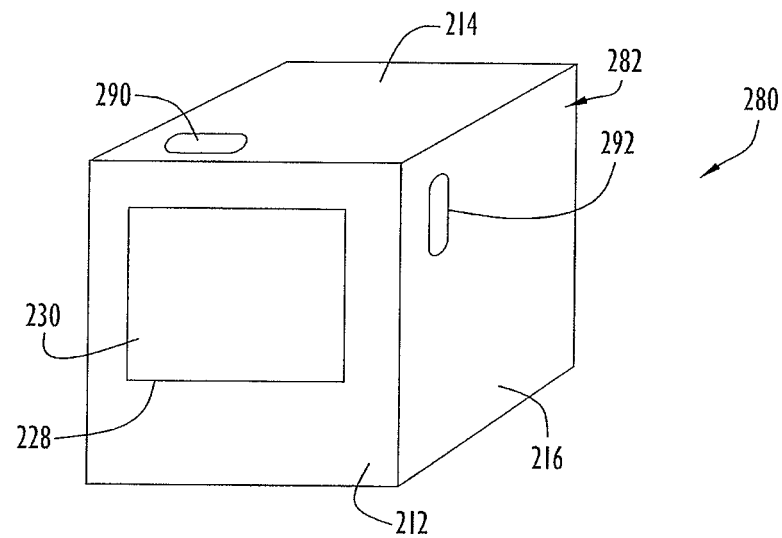
FIG. 9 is a front perspective view of an alternative embodiment of an electronic device according to the invention.

An alternative embodiment of an electronic game device is illustrated in FIG. 9. In this embodiment, components and features of the electronic game device 280 that are similar to those of the electronic game device 200 described above have the same reference numbers.

Electronic game device 280 includes a housing 282 with several switches or input mechanisms 290 and 292 disposed on the housing 282. The quantity and locations of the switches can vary. A user can actuate one of the switches 290, 292 to provide an input to the device 280. For example, if a question during a game requires a response from a user that includes a selection of one of the sides of the housing 282, the user can actuate the switch on the corresponding side of the housing 282.

Figure 10:
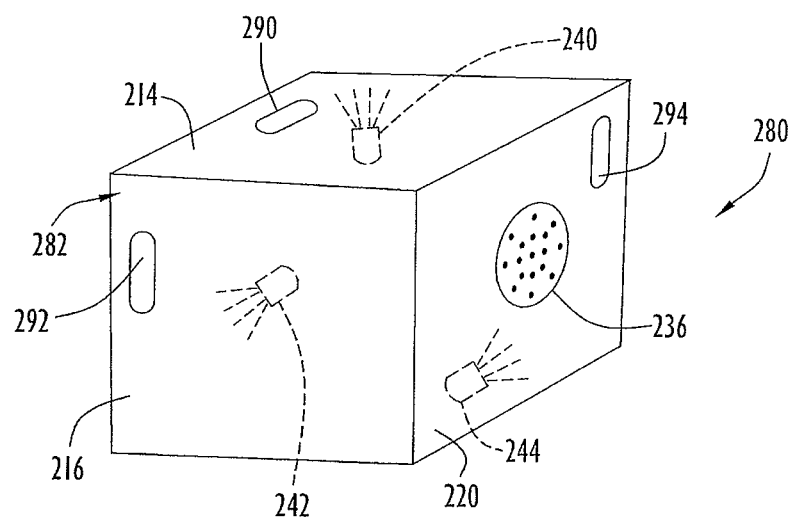
FIG. 10 is a side perspective view of the electronic device illustrated in FIG. 9 in a different orientation.

Referring to FIG. 10, the electronic device 280 is illustrated in a different orientation, which shows switch 294 on side 220. In one embodiment, the housing can include a switch or input mechanism for each side of the housing. The switches can be inductive, capacitive, or mechanical switches that are closed when contacted by the user.

During operation of a game on the electronic game device 200, a question or statement can be presented to the user which requires the user to select an answer. In one implementation, the game may associate a visual indicator, such as a color, with each of the answers proposed to the user on the screen. The visual indicators could be in the form of different colored fonts for each of the answers, different colored highlighting proximate to or surrounding each of the answers, or a different colored mark or object next to each of the answers. For example, each of the answers on the screen may be in a different colored font. Alternatively, each of the answers may have a highlighting around the answer, which each highlighting being a different color. Alternatively, each of the answers may have an object or shape next to it, with each shape being a different color.

The visual indicators or colors correspond to the different colors of the visual output devices in the housing 210. Accordingly, different sides of the housing 210 will be illuminated in different colors associated with the answers to the question. Once the user selects an answer, the user manipulates the housing 210 so that the particular colored side is in the orientation for the input of an answer, and the user registers the answer. The "answer" orientation can be in an upward orientation.

The registration of an answer by the user involves the closing of a switch by the user. The user may contact a switch on the desired side of the housing. Alternatively, the user may tap or contact the housing so that an internal switch is closed, indicating that the answer has been made. Finally, mere orientation can close an internal switch.

Figures 11, 12, 13:
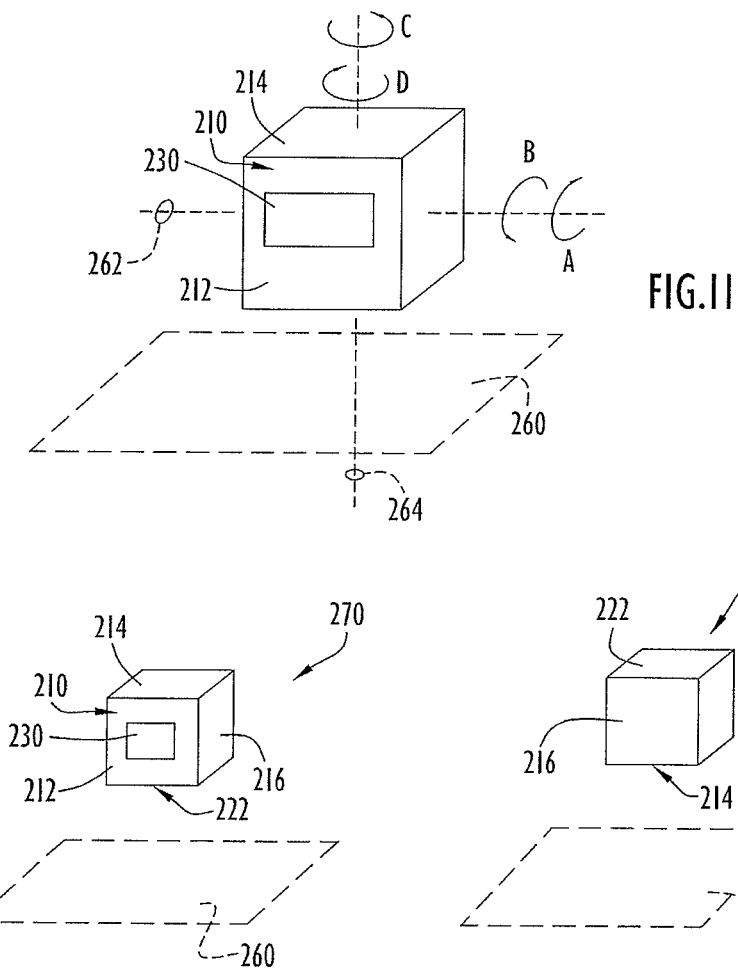
FIG. 11 is a perspective view of the electronic device illustrated in FIG. 5 and the relative directions of its movement.
FIG. 12 is a perspective view of the electronic device illustrated in FIG. 5 in a first orientation.
FIG. 13 is a perspective view of the electronic device illustrated in FIG. 12 in a second orientation.

Referring to FIG. 11, the movement of the housing 210 is described. The housing 210 can be disposed in a first configuration or orientation. This configuration or orientation can be relative to a horizontal plane 260. As shown, side 214 is disposed away from the plane 260. The movement of the housing 210 described below relates to the particular directions in which a user can rotate, shake or adjust the housing 210 to provide a particular input to the electronic device 200.

The housing 210 can be moved about an axis 262 along the direction of arrow "A" or arrow "B." This motion can be referred to as an "up-and-down" motion, such as the nodding of a person's head, or a "yes" motion. The housing 210 can also be moved about an axis 264 along the direction of arrow "C" or arrow "D." This motion can be referred to as a "side-to-side" motion, such as the shaking of a person's head, or a "no" motion.

During the operation of a game on the electronic game device 200, a question or statement can be presented to the user which requires the user to move the housing 210 in a particular direction to answer. For example, a "yes/no" question can be presented to the user. Alternatively, a "true/false" question or statement can be presented to the user. Each of these types of questions require the user to move the housing 210 along the directions of arrows "A" and "B" or the directions of arrows "C" and "D," depending on the particular answer. The motion detector 128 of the electronic game device 200 will determine the particular motion of the housing 210 and the controller will determine whether the motion is in the correct directions.

Alternatively, the presented question or questions may be math-related. In one implementation, the game may includes a series of math questions which must be answered by the user as quickly as possible under a timed environment. For example, six math question may be presented on the screen and the user must answer them in order by moving the housing the appropriate number of times for each answer. For example, one of the questions may be "4+5=." To correctly answer the question, the user must rotate the housing 210 in the proper direction nine times and then register the answer. As previously disclosed, the registering of the answer includes tapping or contacting the housing 210 in one implementation or contacting a switch in another implementation.

In one embodiment, the housing 210 must be moved about a particular axis for the movement to be counted. In an alternative embodiment, the housing 210 does not need to be moved about a particular axis, but can be moved in any direction. The motion detector 128 in the housing 210 can sense each motion of the housing 210 and maintain a count thereof.

In one embodiment, each movement of the housing 210 may be worth "1" in the counting for the answer. In another embodiment, each movement of the housing 210 about a first axis may be worth "1" in the counting for the answer and each movement of the housing about a second axis different from the first axis may be worth a quantity other than "1," such as "10." In other words, if the answer to a proposed question is 49, then the user would move the housing 210 about the first axis nine times and about the second axis four times and then register the answer.

Referring to FIGS. 12 and 13, alternative orientations of the housing 210 are illustrated. In FIG. 12, the housing 210 is in a first orientation 270 with side 214 upward with respect to a horizontal plane 260. In FIG. 13, the housing is in a second orientation 272 with side 222 upward with respect to the horizontal plane. While the "answer" orientation for the housing 210 is disclosed as the side desired to be selected in an upward position or orientation, in other embodiments, the "answer" orientation can be any other orientation, including a downward position or orientation.

The electronic game device may include several events relating to the operation or status of the device. Outputs, such as visual or audible outputs, can be generated when an event occurs or is occurring. The outputs may include a sequence of sounds and/or a sequence of illuminations of different color light. Some exemplary types of events include: system start up, when the device goes to "sleep," when the device "wakes up," when the device "shuts down," in response to a correct answer, in response to an incorrect answer, while a timer is counting down, when a period of time expires, and when the housing being manipulated in different directions.

Some exemplary types of question and answer games are described below. In various embodiments, the types of question and answer games downloaded to and playable on the electronic game device can vary. Each of the games can be played by one or more players. Also, after an answer has been inputted or selected, a fact or factoid may be provided to the player or players to explain the answer.

In one type of question and answer game, a question and four color-coded answers, such as multiple choice answers, are presented on the display screen. The players must read the question and rotate the housing until the housing lights up in the color that corresponds to the desired multiple choice answer. When the housing is illuminated in the desired color, the player selects the desired answer by tapping the unit one or more times as an indication that this is the final answer selection. In this type of game, after answering the question, the players may receive a fact or factoid to help explain the answer. In another embodiment of this game, the players must read the question and rotate the housing until they find the colored side that matches the answer they want, and tap or contact the cube to select the side and the corresponding answer.

In another type of question and answer game, players will be presented with a statement and they must determine whether it is true or false. If the statement is true, the player shakes the housing in an up-and-down direction (such as a conventional y-axis). If the statement is false, the player shakes the housing in a side-to-side or left-to-right direction (such as a conventional x-axis). In this implementation of this game, it is not necessary for the players to take the further step of tapping or contacting the housing to select an answer. In this game, after answering the question, the player may receive a fact to help explain the answer.

In another type of question and answer game, players will be presented with an "either-or" title, such as HOT or COLD. The "either-or" structure requires that a quick or snap decision be made. This game includes a directive about how to answer the questions. Each option will have a pair of arrows indicating which direction the player needs to shake or rotate the housing to choose that option. For example, "HOT" might have a pair of up and down arrows beside it, and "COLD" might have side-to-side arrows beside it. Following the title, the players will see a series of words, in one example, ten words. The words and/or phrase options will appear one at a time. The players must decide whether each word is either "HOT" or "COLD" and then shake the cube in the appropriate direction. In one implementation, the players receive one point for each correct answer. This game can be timed using a conventional timing element so the players must be cognizant of the time taken to respond. Other examples are "SHAKEN" or "STIRRED" and "RHYTHM" or "BLUES." In one implementation of this game, it is not necessary for the players to tap or contact the housing to select an answer.

In another type of question and answer game, a series of simple math problems are presented to the players. These problems can be word based math problems. The questions have a numeric answer that players answer by shaking the housing up and down or side-to-side that number of times. In this type of game, the simple math problems are presented in a limited amount of time, gradually becoming harder. In this implementation, players shake the housing up and down (to count off by 1's) or side to side (to count off by 10s) until they count off the appropriate numbers. After a particular set of shaking, the players slap or contact a side after each answer to input it and indicate that they are done counting. In a variation of this type of game, instead of math problems, a story with a numeric answer can be presented and the players shake the housing the required number of times.

In another type of question and answer game, one or more questions that have a color as an answer can be presented. The color that is the answer to the question is one of the colors in which the housing can be illuminated. For example, if the housing can be illuminated in red, green, blue, and purple, the proposed answers to a question will be those colors so that the players must select one. Once a player determines the answer color, the player rotates the housing until the housing is illuminated in the color that is the correct answer. The player then contacts or slaps the housing once or twice to input and select the player's answer.

In another type of question and answer game, players are presented with a list of four words or clues. The players must determine what those four words have in common. The players must pick the appropriate answer from a series of color-coded multiple choice answers, rotate the housing until the housing is illuminated in the color matching the answer, then contact or slap the housing once or twice to input and register their answer.

Another type of question and answer game is the inverse of the previously described game. In this type of game, players will be presented with a list of four color-coded words or clues and the players must determine which of the four does not belong with the other three. The players must then rotate the housing until the housing is illuminated in the color that matches their choice and then contact or slap once or twice the housing to input and register their answer.

In yet another type of question and answer game, a quote or phrase of five words or less will appear jumbled up or scrambled on the screen. Each word will be color-coded.

Players must reassemble or unscramble the quote or phrase and then input the answer by sequentially rotating the housing to the correct colors in the correct order. The player should contact or slap the housing after each color selection to lock the words into place. A final screen may appear flashing the correct answer.

Finally, another type of question and answer game may be a hot-potato kind of game. In this type of game, one at a time, the screen will flash a series of colors. Alternatively, a sequence or list of colors will be displayed. The first player on a team must rotate the housing until the housing is illuminated in that color, contact or slap the side of the housing once or twice to input their answer, then pass the housing to the next player on their team to find the next color. The players must race to find all the colors before the time for their turn runs out.

Each of these types of question and answer games can be formatted in a player-vs.-player and a team-vs.-team format using the electronic game device. For those games that involve a timer countdown, the electronic game device may include a countdown on the screen and/or "enforce" the countdown or end of the time by generating sounds or lights. For those games that involve multiple teams, scoring may be provided on the visual display of the device.

When an electronic game device is initially used, the electronic game device is registered with the game database and the game website. By registering the particular electronic game device, game play and user information can be maintained for the particular device in the game database and the game website. The electronic game device includes information that uniquely identifies the device. For example, an electronic game device can include a serial number that is unique to the device so device specific information can be maintained. In another example, an electronic game device can include an identification code that includes numbers, letters and/or other characters that is unique to the device.

Figure 14:
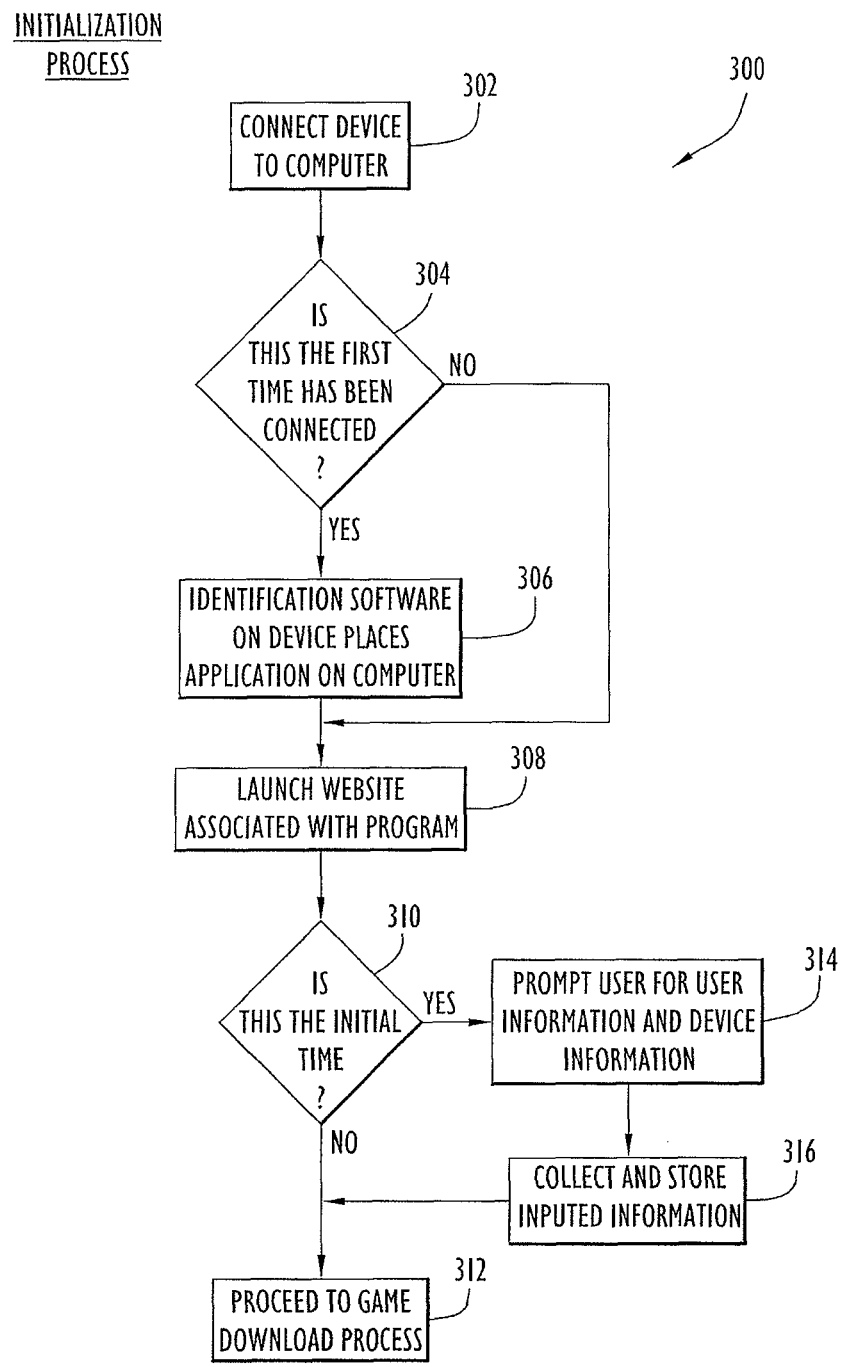
FIG. 14 is a flowchart of an exemplary initialization process according to the invention.

Now, several exemplary processes of the invention will be described. Referring to FIG. 14, an exemplary initialization process 300 is described. In step 302, the user connects the electronic game device to a computer. Preferably, the computer is connected or connectable to the Internet so that information relating to the game can be exchanged between the electronic game device, the computer, and the website associated with the game. In one process, the user plugs the removable USB flash drive or USB cable tethered or coupled to the housing into the computer.

In another embodiment, for initializing a new game, the electronic game will be provided with a disc or CD which when used with a personal computer will load an application relating to the game on the personal computer. Once the application is loaded on the personal computer, a user launches the application via an icon or other link on the personal computer. For example, a user can launch an application using a icon on the desktop of the personal computer.

In step 304, the software on the electronic game device and the computer determine whether this is the first time that the electronic game device has been connected to the computer. If it is the first time, the process continues to step 306. If it is not the first time, the process continues to step 308.

In step 306, the identification software on the device places the corresponding question and answer game application software on the computer. This question and answer game application software facilitates the communication between the electronic device and the website. At this point, the serial number or other identification information relating to the particular electronic game device can be registered with the game database and the game website.

In step 308, the question and answer game application software launches the website associated with the game program. In one implementation, the identification software on the flash drive, or electronic game device, automatically launches the game website and proceeds with the registration of the user and the electronic game device.

In step 310, the software determines whether this is the initial time that the website has been accessed by this electronic game device. If it is the first time, the process continues to step 314. If it is not the first time, the process proceeds to step 312, which represents the process for downloading a game.

In step 314, the system prompts the user for user information, such as gender, age range, and location. Other information may be sought and collected. A name for the particular electronic game device is also requested from the user. By setting up a user name and password, the owner of the electronic game device will unlock deeper portions of the game database associated with the question and answer game.

In step 316, the inputted information is stored for future use.

In step 312, the process for downloading a game is executed. An exemplary downloading process is illustrated in FIG. 15.

When the electronic game device is subsequently connected to the question and answer game website after the user plays a downloaded type of game, the system will automatically upload the player's scores to the game database. The player's scores can be compared to the scores of other players that are stored in the database.

Figure 15:
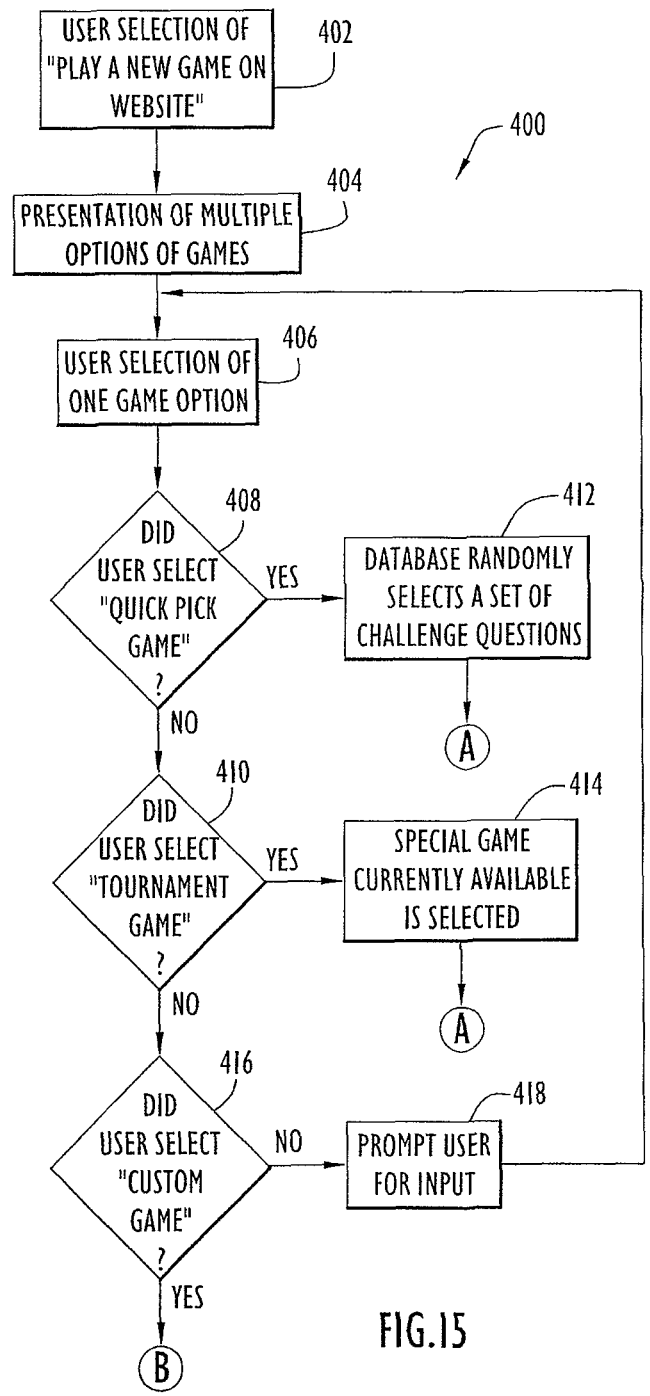
FIGS. 15 and 16 are flowcharts of an exemplary game content download process according to the invention.

An exemplary embodiment of a game download process is illustrated in FIG. 15. In this embodiment, the game download process 400 is merely exemplary and various game download processes may include some and not all of the illustrated steps.

In step 402, on the website, the user selects the option of "Play a New Game on Website."

In step 404, the website presents multiple options of games to the user for selection. For example, the website may present the options of "Custom Game," "Quick Pick Game" and "Tournament Game."

In step 406, the user selected one of the game options.

Figure 16:
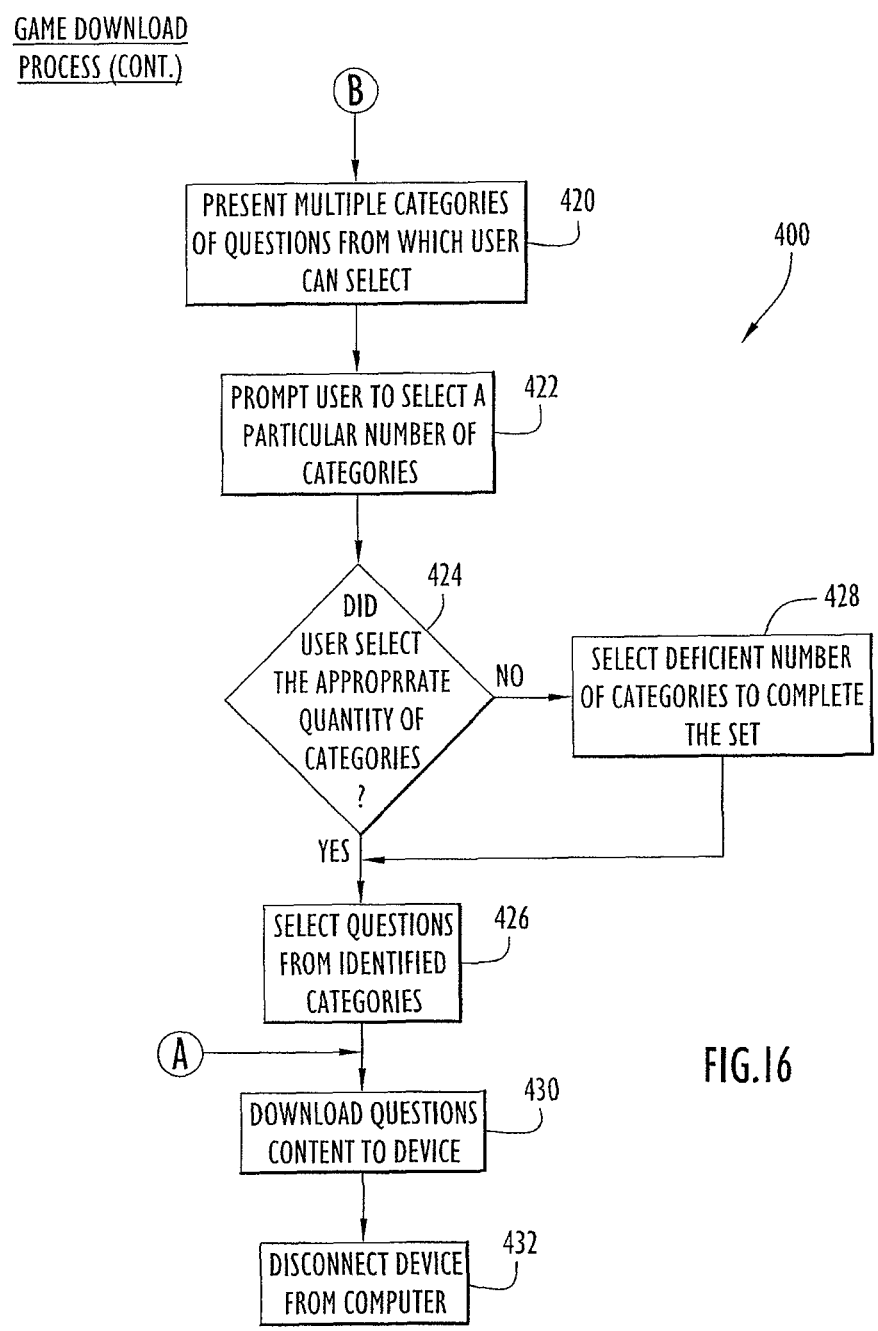

In step 408, the website determines whether the user selected "Quick Pick Game" and if so, the process proceeds to step 412 in which the website database randomly selects a set of challenge questions to be downloaded to the electronic device. The process then continues to step 430 (see FIG. 16).

If the user did not pick "Quick Pick Game," then the website determines whether the user selected "Tournament Game" (see step 410). If the user did select "Tournament Game", the process continues to step 414 and a special game currently available is selected to be downloaded to the electronic game device. The process then continues to step 430 (see FIG. 16). A special game may be a set of questions or other game content that is periodically updated and maintained on the website for user selection for a limited period of time.

If the user did not pick "Tournament Game," then the website determines whether the user selected "Custom Game." If the user did not, then in step 418, the website prompts the user for input and the process returns to step 406.

If the user did pick "Custom Game," then in step 420, multiple categories of questions from which the user can select are presented. Some exemplary categories include: movies, tv, music, sports, food and drink, history, science, boy/girl, art and literature, and "where are we." These categories of questions can be expanded and additional game content added at any time.

In step 422, the user is prompted to select a particular quantity of categories, such as four categories.

In step 424, the website determines whether the user selected the appropriate quantity of categories of questions. If not, then in step 428, the website determines the deficiency in the quantity of categories selected (whether only two or three categories were selected for example), and then picks additional categories as needed. The goal of multiple categories is to build a large enough group of questions so multiple questions are not repeated.

In step 426, the database selects a certain number of questions from each of the categories.

In step 430, the questions and other game content are downloaded to the electronic game device.

In step 432, the electronic game device is disconnected from the computer and can be used to play any of the downloaded games.

Figure 17:
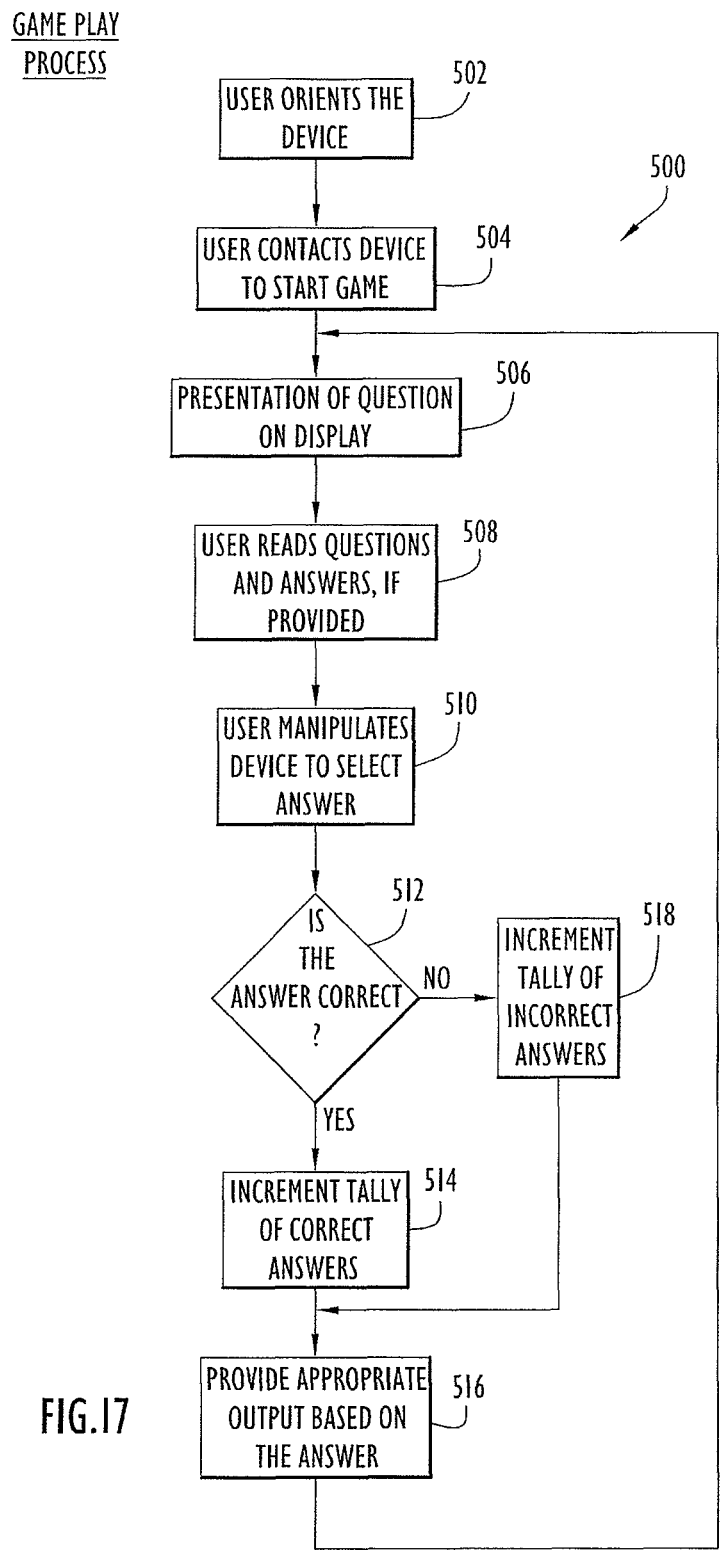
FIG. 17 is a flowchart of an exemplary game play process according to the invention.

An exemplary embodiment of a game play process using the now stand-alone electronic game device is illustrated in FIG. 17. In this embodiment, the game play process 500 begins with one of the players or users orienting the electronic device so that the other players can see the visual display or screen for purposes of participation (step 502).

In an alternative mode of operation, in which there is a single user or player for the electronic game, the user orients the device so that the user sees the visual display on the device.

In step 504, the user contacts the electronic game device to start the game. In alternative embodiments, the question and answer game may start when the electronic game device is turned on.

In step 506, a question or statement is presented on the display or LCD screen.

In step 508, the user reads the question or statement and any potential answers that are provided.

In step 510, the user manipulates the electronic game device to select the desired answer. The manipulation may be any type of handling of the device as previously described. The manipulation includes registering the answer.

In step 512, the controller determines whether the answer is correct. Depending on the whether the answer is correct, the tally of correct answers is increased (step 514) or the tally of incorrect answers is increased (step 518). This allows the device to maintain a score for the game play.

In step 516, appropriate output, such as lights or sounds, can be generated in response to the accuracy of the answer.

Figure 18:
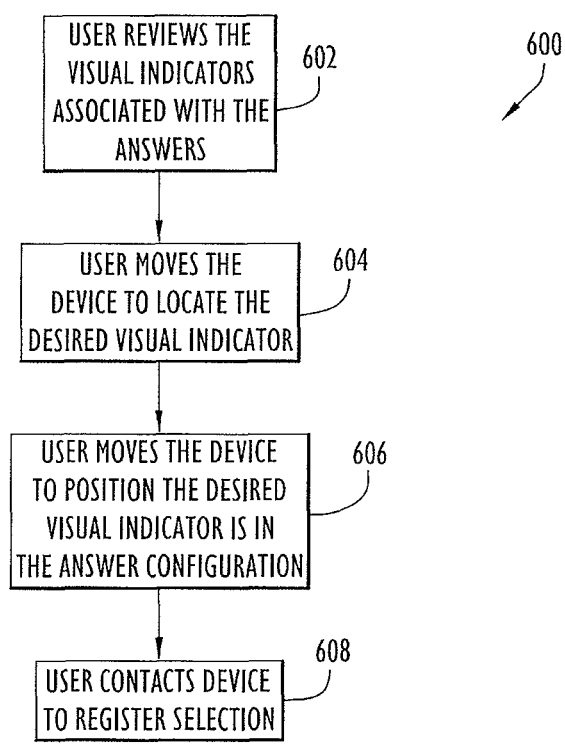
FIG. 18 is a flowchart of an exemplary game device manipulation process according to the invention.

An exemplary manipulation process of the electronic game device is illustrated in FIG. 18. In this embodiment, the manipulation process 600 involves the user reviewing the visual indicators associated with the answers (step 602). The visual indicators can be different colors or objects as previously described.

In step 604, assuming that colors are used as the visual indicators, the user moves the electronic game device to locate the side of the housing with the desired visual indicator or color.

In step 606, the user manipulates the housing to a position in which the desired visual indicator is in the "answer" orientation or configuration.

In step 608, the user contacts the housing to register the selection of an answer.

Figure 19:
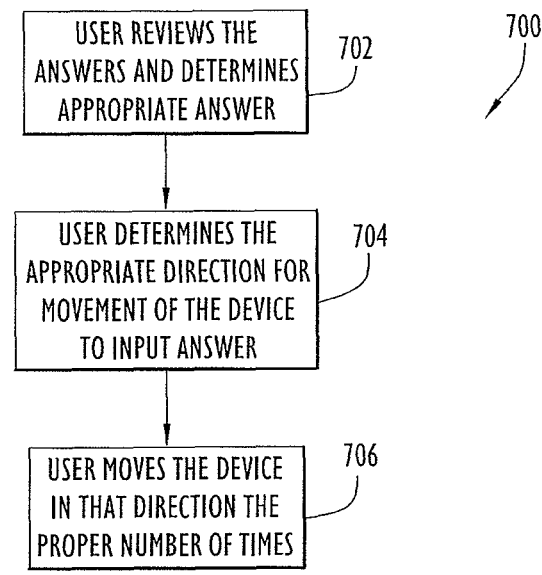
FIG. 19 is a flowchart of an alternative exemplary game device manipulation process according to the invention.

Another exemplary manipulation process is illustrated in FIG. 19. In this embodiment, the manipulation process 700 involves the user reviewing the answers and determining the appropriate answer (step 702). In this embodiment, the appropriate method of answering a question is to move the housing in a particular direction.

In step 704, the user determines the appropriate direction in which the housing should be moved, based on the desired answer. For example, the housing may be moved in an up-and-down ("yes") direction or in a side-to-side ("no") direction.

In step 706, the user moves the housing in the particular direction the proper number of times and then registers the answer.

The electronic game device may include or function in other modes of operation or processes. For example, after the electronic game device is powered up, a selection can be made between several modes of operation, including an ambient mode, a game mode, and a game demo mode.

In the ambient mode, a series of lights and/or sounds is generated. The generated output may be for a predetermined period of time (30 minutes, 1 hour, 2 hours, or 4 hours) or may be continuous until the device is turned off.

In the game mode, the player or players selects one of a quick-pick game, a tournament game or a custom game. After the game has been selected, the player indicates whether team play or solo play is desired. In solo play, the score for the particular game is saved at the end of the game. In team play, the first team plays by selecting an answer and providing the necessary input. If the answer is correct, then the electronic game device generates a positive sound and light output and the team is awarded one point. If the answer is incorrect, then the electronic game device generates a negative sound and light output and the team loses one point. The team score is recorded and both teams' scores are shown. The first team then passes the device to the second team, who in turn repeats the above-described sequence. The final scores of the teams are determined and if the scores are tied, then a tie breaker game is played. After a team eventually wins, the scores of the teams are saved.

While the invention has been described in detail and with references to specific embodiments thereof, it will be apparent to one skilled in the art that various changes and modifications can be made therein without departing from the spirit and scope thereof. Thus, it is intended that the present invention covers the modifications and variations of this invention provided they come within the scope of the appended claims and their equivalents.

What is claimed is:

1. An electronic device for playing a game, comprising:
    a housing having an output device that can present a question to a user, the question having a correct answer, the housing defining a first axis and a second axis orthogonal to the first axis, the housing being movable about the first axis and movable about the second axis;
    a motion detector disposed in the housing, the motion detector detecting movement of the housing about the first axis or the second axis; and
    a control mechanism disposed in the housing and connected to the motion detector, the control mechanism determining whether the user has moved the housing about the first axis or the second axis, determining an answer to the question based on the detected movement of the housing about the first axis and/or the second axis, comparing the answer based on the detected movement of the housing, and providing an output based on whether the answer based on the detected movement is the correct answer to the question.

2. The electronic device of claim 1, wherein movement of the housing about the first axis results in a different input than movement of the housing about the second axis.

3. The electronic device of claim 1, wherein movement of the housing about the first axis involves moving the housing back and forth about the first axis.

4. The electronic device of claim 1, wherein movement of the housing about the first axis a certain number of times results in a different input with a different value than movement of the housing about the second axis the certain number of times.

5. The electronic device of claim 4, wherein movement of the housing once about the first axis creates a value of one and movement of the housing once about the second axis creates a value larger than one.

6. The electronic device of claim 1, further comprising:
an input mechanism coupled to the housing and connected to the control mechanism, the user actuating the input mechanism to select a particular answer after moving the housing about at least one of the first axis or the second axis.

7. The electronic device of claim 6, wherein a collective quantity of movements about the first axis and movements about the second axis can be selected by actuating the input mechanism.

8. The electronic device of claim 7, wherein the input mechanism includes a switch that is actuated by the application of a force to the housing.

9. The electronic device of claim 1, wherein the question requires the input of a number as an answer to the question, and each movement of the housing about the first axis adds a first value to a potential answer and each movement of the housing about the second axis adds a second value to the potential answer, the first value being different than the second value.

10. The electronic device of claim 1, wherein movement of the housing about the first axis once counts by a different number than movement of the housing about the second axis once.

11. The electronic device of claim 1, wherein movement of the housing about the first axis counts numbers at a first rate per movement, and movement of the housing about the second axis counts numbers at a second rate per movement, the second rate being different than the first rate.

12. The electronic device of claim 1, wherein the correct answer to the question requires that the user move the housing a certain number of times about the first axis.

13. The electronic device of claim 1, wherein the correct answer to the question requires that the user move the housing at least once about the first axis and at least once about the second axis.

14. The electronic device of claim 1, wherein the output device is a display that is configured to display the question to the user.

15. An electronic device for playing a game, comprising:
a housing having an output device that can present a question to a user, the question having a correct answer, the housing defining a first axis and a second axis perpendicular to the first axis, the housing being movable about the first axis and movable about the second axis;
a motion detector disposed in the housing, the motion detector determining movement of the housing about the first axis or the second axis; and
a control mechanism disposed in the housing and connected to the motion detector, the control mechanism maintaining a first value assigned to the movement of the housing about the first axis and maintaining a second value assigned to the movement of the housing about the second axis, the control mechanism determining a collective value corresponding to movements of the housing relative to the first axis or the second axis based on the collective determined movements of the housing about the first axis and/or the second axis determined by the motion detector in response to the question, the control mechanism comparing the collective value to the correct answer, determining whether the collective value corresponds to the correct answer, and generating an output indicative of whether the collective value corresponds to the correct answer.

16. The electronic device of claim 15, wherein each movement of the housing about the first axis has a different value than each movement of the housing about the second axis.

17. The electronic device of claim 15, wherein the correct answer to the question requires that the user move the housing at least once about the first axis and at least once about the second axis.

18. A method of playing a game on an electronic device that includes a housing, a motion detector that determines movement of the housing, and a control mechanism for controlling outputs from the housing based in part on the determined movements of the housing, the method comprising:
receiving a question from the housing, the question having a correct answer;
determining a proposed answer to the question;
manipulating the housing about at least one of a first axis to count by a first increment for each movement about the first axis or a second axis to count by a second increment for each movement about the second axis to count to the proposed answer, the second increment being larger than the first increment; and
receiving an output from the housing that indicates whether the proposed answer corresponds to the correct answer.

19. The method of claim 18, further comprising a step of:
imparting a force to the housing to select the proposed answer.

20. The method of claim 18, wherein manipulating the housing to count to the proposed answer includes movement of the housing about the first axis at least once and movement of the housing about the second axis at least once.

* * * * *